(12) United States Patent
Fujita et al.

(10) Patent No.: US 11,384,274 B2
(45) Date of Patent: Jul. 12, 2022

(54) DIVERTING AGENT AND METHOD OF FILLING FRACTURE IN WELL USING SAME

(71) Applicant: Mitsubishi Chemical Corporation, Tokyo (JP)

(72) Inventors: Tomoya Fujita, Tokyo (JP); Takahiro Saka, Tokyo (JP); Chizuko Furo, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/910,132

(22) Filed: Jun. 24, 2020

(65) Prior Publication Data

US 2020/0317985 A1 Oct. 8, 2020

Related U.S. Application Data

(63) Continuation of application No. PCT/JP2018/048310, filed on Dec. 27, 2018.

(30) Foreign Application Priority Data

Dec. 28, 2017 (JP) .............................. JP2017-254844

(51) Int. Cl.
*C09K 8/04* (2006.01)
*C09K 8/508* (2006.01)
*C08L 29/04* (2006.01)
*C09K 8/516* (2006.01)

(52) U.S. Cl.
CPC ............ *C09K 8/5083* (2013.01); *C08L 29/04* (2013.01); *C09K 8/516* (2013.01)

(58) Field of Classification Search
CPC .......... C09K 5/083; C09K 8/88; C09K 8/508; C08L 29/04; E21B 43/26
See application file for complete search history.

(56) References Cited

U.S. PATENT DOCUMENTS

| | | |
|---|---|---|
| 2006/0118301 A1 | 6/2006 | East et al. |
| 2012/0111565 A1 | 5/2012 | Garcia-Lopez De Victoria et al. |
| 2016/0102244 A1 | 4/2016 | Takahashi et al. |
| 2016/0177693 A1 | 6/2016 | Gomaa et al. |
| 2016/0298017 A1 | 10/2016 | Takahashi et al. |
| 2017/0037294 A1 | 2/2017 | Mandai et al. |
| 2017/0253703 A1 | 9/2017 | Yoshikawa et al. |
| 2018/0010037 A1 | 1/2018 | Yoshikawa et al. |

FOREIGN PATENT DOCUMENTS

| | | |
|---|---|---|
| CN | 102695727 A | 9/2012 |
| CN | 106867487 A | 6/2017 |
| JP | 2016-056272 A | 4/2016 |
| JP | 2016-147971 A | 8/2016 |
| JP | 2016-147972 A | 8/2016 |
| WO | 2014/196474 A1 | 12/2014 |
| WO | 2015/072317 A1 | 5/2015 |
| WO | 2015/099131 A1 | 7/2015 |

OTHER PUBLICATIONS

ISR issued in WIPO Patent Application No. PCT/JP2018/048310, dated Mar. 5, 2019, English translation.
Written Opinion issued in WIPO Patent Application No. PCT/JP2018/048310, dated Mar. 5, 2019, English translation.
IPRP issued in WIPO Patent Application No. PCT/JP2018/048310, dated Jun. 30, 2020, English translation.
EESR issued in EP Patent Application No. 18897856.3, Feb. 9, 2021.
Office Action in corresponding Chinese Patent App. No. 201880084065.5, dated Apr. 1, 2022, along with its English translation.

*Primary Examiner* — Peter D. Mulcahy
(74) *Attorney, Agent, or Firm* — Greenblum & Bernstein, P.L.C.

(57) ABSTRACT

The diverting agent of the present invention contains resin particles of polyvinyl alcohol-based resin. The resin particles of polyvinyl alcohol-based resin are a particle mixture containing two or more types of resin particles having different particle diameters, and the diverting agent contains resin particles A of polyvinyl alcohol-based resin having a particle diameter of 1,700 μm or more in a range of 5 mass % to 95 mass % and resin particles B of polyvinyl alcohol-based resin having a particle diameter of 250 μm to 1,000 μm in a range of 5 mass % to 95 mass %.

6 Claims, No Drawings

DIVERTING AGENT AND METHOD OF FILLING FRACTURE IN WELL USING SAME

CLAIM FOR PRIORITY

This application is a Continuation of PCT/JP2018/048310 filed Dec. 27, 2018, and claims the priority benefit of Japanese application 2017-254844 filed Dec. 28, 2017, the contents of which are expressly incorporated by reference herein in their entireties.

TECHNICAL FIELD

The present invention relates to a diverting agent and a method of filling a fracture in a well using the diverting agent. More specifically, the present invention relates to a diverting agent to be used during construction of an excavation method using a hydraulic fracturing method, and a method of filling a fracture in a well using the diverting agent.

BACKGROUND ART

For collecting petroleum or other underground resources, a hydraulic fracturing method in which high-pressure water is injected into an underground shale layer to cause fractures is widely adopted. In the hydraulic fracturing method, at first, a vertical hole (vertical well) with a depth of several thousand of meters is excavated vertically by a drill, and then, when the vertical hole reaches the shale layer, a horizontal hole (horizontal well) with a diameter of ten to several tens of centimeters is excavated horizontally. By filling the vertical well and the horizontal well with a fluid and pressurizing the fluid, fractures are generated from the well. Natural gas, petroleum (shale gas/oil), or the like in the shale layer flows out from the fractures, and is then collected. According to such a method, a resource inflow cross-section of wells can be increased by generation of fractures and underground resources can be efficiently collected.

In the hydraulic fracturing method described above, prior to generation of fractures by fluid pressurization, preliminary blasting called perforation is performed in the horizontal well. By such preliminary blasting, borings are made from the well to a production layer. After that, by injecting a fracturing fluid into the well, the fluid flows into these borings, and a load is applied to the borings. Then, fractures are generated in these borings and grow into fractures in a size suitable for resource collection.

In the hydraulic fracturing method, a part of fractures that have already been generated is temporarily filled with an additive called a diverting agent in order to grow fractures that have already been generated larger or to generate more fractures. By temporarily filling a part of the fractures with the diverting agent and pressurizing the fracturing fluid filled in the well in this state, the fluid may enter other fractures, so that other fractures can grow large or new fractures can be generated.

Since the diverting agent is used to temporarily fill the fractures as described above, a diverting agent which can maintain the shape for a certain period of time and disappears by hydrolysis when a natural gas, petroleum, or the like is collected is used. For example, various techniques in which a hydrolyzable resin such as polyglycolic acid or polylactic acid is used as a diverting agent have been proposed.

Patent Literature 1 has proposed a temporary sealing agent for use in well boring, which contains polyglycolic acid having high biodegradability among biodegradable aliphatic polyester-based resins.

Patent Literature 2 has proposed a powder containing particles of polylactic acid which is a biodegradable resin, and in the powder, 50 mass % or more of particles do not pass through a sieve having an opening of 500 μm and the particles have an angle of repose of 51 degrees or more.

Patent Literature 3 has proposed hydrolyzable particles having a dispersion structure in which fine particles of a polyoxalate having a high biodegradability for adjusting the hydrolysis performance of polylactic acid are distributed in the polylactic acid, and having an average particle diameter ($D_{50}$) in a range of 300 μm to 1,000 μm and a roundness, that is, a minor axis/major axis ratio, of 0.8 or more.

Patent Literature 4 has proposed polyoxalate particles having an average particle diameter ($D_{50}$) in a range of 300 μm to 1,000 μm and a roundness, that is, a minor axis/major axis ratio, of 0.8 or more.

CITATION LIST

Patent Literature

Patent Literature 1: WO 2015/072317
Patent Literature 2: JP-A-2016-56272
Patent Literature 3: JP-A-2016-147971
Patent Literature 4: JP-A-2016-147972

SUMMARY OF INVENTION

Technical Problem

In the hydraulic fracturing method, it is necessary to fill the fracture that have already been generated without gaps in order to grow the fractures or generate new fractures, but the diverting agent in the conventional art has insufficient filling performance. In addition, there are places where the temperature can be as low as 40° C. to 60° C. depending on where the resources are collected. However, polyglycolic acid, polylactic acid, and the like have a problem that the biodegradation rate is low in the low temperature range as described above, and it takes a considerable time before they are removed.

Therefore, the present invention has been made to solve the above problems, and an object thereof is to provide a diverting agent which can exhibit sufficient filling performance against fractures of a well, does not dissolve or completely dissolve for a certain period of time (about 30 minutes to 2 weeks), and is quickly dissolved and removed after a certain period of time in an excavation method using a hydraulic fracturing method.

Solution to Problem

As a result of intensive studies, the present inventors have found that by using resin particles of polyvinyl alcohol-based resin as a diverting agent, and further containing the resin particles as a particle mixture of two or more types of resin particles having different sizes (particle diameters), the above problems can be solved.

That is, the present invention is characterized in the following (1) to (6).
(1) A diverting agent comprising resin particles of polyvinyl alcohol-based resin, wherein the resin particles of polyvinyl alcohol-based resin are a particle mixture containing two or more types of resin particles having different particle diameters, and the diverting agent contains resin particles A of polyvinyl alcohol-based resin having a particle diameter of 1,700 μm or more in a range of 5 mass % to 95 mass % and resin particles B of polyvinyl alcohol-based resin having a particle diameter of 250 μm to 1,000 μm in a range of 5 mass % to 95 mass %.

(2) The diverting agent according to the above (1), wherein the particle mixture has a bulk density of 0.57 g/ml to 0.85 g/ml and an angle of repose of 40° to 70°.

(3) The diverting agent according to the above (1) or (2), wherein the particle mixture contains two or more types of resin particles having different shapes.

(4) The diverting agent according to any one of the above (1) to (3), wherein the polyvinyl alcohol-based resin has a degree of saponification of 90 mol % or more.

(5) The diverting agent according to any one of the above (1) to (4), wherein the polyvinyl alcohol-based resin is a polyvinyl alcohol-based resin containing a primary hydroxy group in a side chain.

(6) A method of filling a fracture in a well which is a method of temporarily filling a fracture generated in a well, the method comprising:

allowing the diverting agent according to any one of the above (1) to (5) to flow into a fracture to be filled with a flow of a fluid in the well.

Advantageous Effects of Invention

The diverting agent of the present invention contains soluble polyvinyl alcohol-based resin particles and thus has good biodegradability at low temperature regions. In addition, since the polyvinyl alcohol-based resin particles are a mixture of resin particles having particle diameters in specific ranges, the particles can be densely filled without gaps, and the filling performance to the target gap can be enhanced. Therefore, the diverting agent of the present invention can be suitably used for a hydraulic fracturing method performed in a drilling operation for natural gas, oil, or the like.

DESCRIPTION OF EMBODIMENTS

Hereinafter, the present invention will be explained below in detail, but the following explanations only show an example of preferred embodiments, the present invention is not limited thereto.

The term "polyvinyl alcohol" is sometimes simply referred to as "PVA".

In the present description, (meth)allyl means allyl or methallyl, (meth)acryl means acryl or methacryl, and (meth)acrylate means acrylate or methacrylate.

Further, in the present description, "mass" has the same meaning as "weight".

The diverting agent of the present invention contains resin particles of polyvinyl alcohol (PVA)-based resin, and the resin particles are a particle mixture containing two or more types of resin particles having different particle diameters.

[PVA-Based Resin Particles]

The resin particles of PVA-based resin (hereinafter, also referred to as PVA-based resin particle) used in the present invention contain at least resin particles A of PVA-based resin having a particle diameter of 1,700 μm or more and resin particles B of PVA-based resin a particle diameter of 250 μm to 1,000 μm. Since the PVA-based resin particles of the present invention are a mixture containing two or more types of resin particles having different particle diameters, the gaps between PVA-based resin particles can be filled with other PVA-based resin particles, and sufficient filling performance against fractures in a well can be exhibited.

In the diverting agent, the resin particles A of PVA-based resin having a particle diameter of 1,700 μm or more are contained in a range of 5 mass % to 95 mass %, and the resin particles B of PVA-based resin having a particle diameter of 250 μm to 1,000 μm are contained in a range of 5 mass % to 95 mass %. When the diverting agent contains the resin particles A and the resin particles B within the above ranges, the resin particles A forms a bridge in the fractures, and the resin particles B fill the gaps between the resin particles A. Therefore, the filling performance is improved, and the effects of the present invention can be obtained. In the diverting agent, the content of the resin particles A is preferably 7 mass % to 90 mass %, and more preferably 10 mass % to 80 mass %, and the content of the resin particles B is preferably 10 mass % to 80 mass %, and more preferably 15 mass % to 75 mass %

Since the resin particles of PVA-based resin having a particle diameter of less than 250 μm are easy to dissolve and the filling performance thereof may deteriorate when the content thereof is large, the content of the resin particles in the diverting agent is preferably in a range of 0 to 30 mass %, more preferably 0 to 20 mass %, and still more preferably 0 to 10 mass %. Since the resin particles of PVA-based resin having a particle diameter of more than 1,000 μm and less than 1,700 μm are easy to dissolve and the filling performance thereof may deteriorate when the content thereof is small, the content of the resin particles in the diverting agent is preferably in a range of 10 mass % to 80 mass %, more preferably 20 mass % to 70 mass %, and still more preferably 30 mass % to 60 mass %.

In the present invention, the particle mixture preferably contains two or more types of PVA-based resin particles having different particle shapes. Since the particle mixture is a combination containing two or more types of resin particles having different shapes, the gaps between PVA-based resin particles are easily filled with other PVA-based resin particles, and thus the filling performance can be improved. The shape of the PVA-based resin particles used in the present invention is not particularly limited, and examples thereof include a spherical shape, a powder shape, an elliptical shape, a columnar shape (pellet), a plate shape, a cubic shape, a rectangular shape, a prismatic shape, and a polygonal shape. From the viewpoint of further improving the effect of the present invention, it is preferable that the mixture is a mixture of columnar particles and powders.

In the present invention, the average particle diameter of the PVA-based resin particles is appropriately adjusted in consideration of the size of the fractures in the well, the shape of the particles, and the like, and is generally in the range of 10 μm to 4 mm.

In a case where the PVA-based resin particle is columnar (pellet), for the average particle diameter thereof the diameter of the cross section orthogonal to the axial direction is preferably 500 μm to 5.0 mm, more preferably 1.0 mm to 4.0 mm, and still more preferably 1.85 mm to 3.0 mm, and the thickness (length in the axial direction) is preferably 500 μm to 5.0 mm, more preferably 1.0 mm to 4.0 mm, and still more preferably 1.85 mm to 3.0 mm.

In a case where the PVA-based resin particle is a spherical particle, the particle is preferably in the form of powder, and the average particle diameter thereof is 10 μm to 2,000 μm, and preferably 100 μm to 1,500 μm.

When the sizes (the diameter, the thickness, and the average particle diameter) are too large, water solubility tends to decrease, and when the sizes are too small, the sealing effect tends to decrease.

In a case of a combination of columnar particles and powdery particles, the particle mixture is, for example, preferably a mixture obtained by combining columnar particles having a cross section orthogonal to the axial direction with a diameter of 0.5 mm to 4.0 mm and a thickness (length in the axial direction) of 0.5 mm to 4.0 mm and powdery particles having an average particle diameter of 10 μm to 2,000 μm.

The average particle diameter of the columnar particles and the powders can be measured by a dry screening test method (see JIS 8815). In the present description, the particle diameter is a particle diameter at which the total on-screen volume is 50%.

In the present invention, the particle mixture of the PVA-based resin particles preferably has a bulk density of 0.57 g/ml to 0.85 g/ml, and more preferably 0.60 g/ml to 0.82 g/ml. The bulk density refers to a density obtained by filling a container having a certain volume with powders or particles and calculating the inner volume as a volume. When the bulk density of the particle mixture is too large, fractures cannot be filled and may flow out, and when the bulk density of the particle mixture is too small, the gap between the particles is large, and the effect of the present invention may not be obtained.

In addition, in the present invention, the particle mixture of the PVA-based resin particles preferably has an angle of repose of 40° to 70°, and more preferably 45° to 65°. The angle of repose is an angle at which a stable state can be maintained without collapse when powders or particles are piled up, and is an angle formed between the piled slope and a horizontal plane. When the angle of repose of the particle mixture is too large, the fluidity when the particle mixture is used as a diverting agent may be poor, making it difficult to handle, and when the angle of repose of the particle mixture is too small, the fractures may not be filled and may flow out of the gap. Therefore, the above range is preferred.

The measurement of the angle of repose can be performed, for example, by putting a sample on the upper part of a device for measuring an angle of repose, dropping the sample, reading the height of the mountain at the highest, and calculating the angle of repose based on the length on the bottom and the height of the mountain.

In the present invention, it is preferable that the particle mixture has a bulk density of 0.57 g/ml to 0.85 g/ml, and an angle of repose of 40° to 70°.

The size (the diameter, the length, and the average particle diameter) and shape of the PVA-based resin particle may be appropriately adjusted in order to set the bulk density and the angle of repose of the particle mixture in the above ranges.

The PVA-based resin used in the present invention has a vinyl alcohol structural unit corresponding to the degree of saponification and a vinyl acetate structural unit of an unsaponified moiety.

In the present invention, examples of the PVA-based resin include a modified PVA-based resin obtained by copolymerizing various monomers during the production of a vinyl ester resin and being saponified, and a variety of post-modified PVA-based resins obtained by introducing various functional groups into an unmodified PVA-based resin by post-modification, in addition to an unmodified PVA-based resin. Such modification can be performed as long as the water solubility of the PVA-based resin is not lost. In some cases, the modified PVA-based resin may be further post-modified.

Examples of the monomer to be used in the copolymerization of the vinyl ester monomer in the production of the vinyl ester resin include: olefins such as ethylene, propylene, isobutylene, α-octene, α-dodecene, and α-octadecene; unsaturated acids such as an acrylic acid, a methacrylic acid, a crotonic acid, a maleic acid, a maleic anhydride, and an itaconic acid, or a salt thereof, a mono-, di-alkyl ester thereof or the like; nitriles such as acrylonitrile and methacrylonitrile; amides such as acrylamide and methacrylamide; olefin sulfonic acids such as an ethylene sulfonic acid, an allyl sulfonic acid, and a methallyl sulfonic acid or a salt thereof; alkyl vinyl ethers; N-acrylamidomethyltrimethylammonium chloride; allyltrimethylammonium chloride; dimethylallyl vinyl ketone; N-vinyl pyrrolidone; vinyl chloride; vinylidene chloride; polyoxyalkylene (meth)allyl ethers such as polyoxyethylene (meth)allyl ether and polyoxypropylene (meth)allyl ether, polyoxyalkylene (meth)acrylates such as polyoxyethylene (meth)acrylate and polyoxypropylene (meth)acrylate; polyoxyalkylene (meth)acrylamides such as polyoxyethylene (meth)acrylamide and polyoxypropylene (meth)acrylamide; polyoxyethylene [1-(meth)acrylamide-1,1-dimethylpropyl] ester: polyoxyalkylene vinyl ethers such as polyoxyethylene vinyl ether and polyoxypropylene vinyl ether; polyoxyalkylene allylamines such as polyoxyethylene allylamine and polyoxypropylene allylamine; polyoxyalkylene vinylamines such as polyoxyethylene vinylamine and polyoxypropylene vinylamine; and hydroxy group-containing α-olefins such as 3-buten-1-ol, 4-penten-1-ol, and 5-hexen-1-ol, or derivatives such as an acylated product thereof.

In addition, examples of the monomer to be used in the copolymerization with the vinyl ester monomer further include diol-containing compounds such as 3,4-dihydroxy-1-butene, 3,4-diacyloxy-1-butene, 3-acyloxy-4-hydroxy-1-butene, 4-acyloxy-3-hydroxy-1-butene, 3,4-diacyloxy-2-methyl-1-butene, 4,5-dihydroxy-1-pentene, 4,5-diasiloxy-1-pentene, 4,5-dihydroxy-3-methyl-1-pentene, 4,5-diasiloxy-3-methyl-1-pentene, 5,6-dihydroxy-1-hexene, 5,6-diasiloxy-1-hexene, glycerin monoallyl ether, 2,3-diacetoxy-1-allyloxypropane, 2-acetoxy-1-allyloxy-3-hydroxypropane, 3-acetoxy-1-allyloxy-2-hydroxypropane, glycerin monovinyl ether, glycerin monoisopropenyl ether, vinyl ethylene carbonate, and 2,2-dimethyl-4-vinyl-1,3-dioxolane.

Examples of the post-modified PVA-based resin obtained by introducing functional groups by a post-reaction include those having an acetoacetyl group by a reaction with diketene, those containing a polyalkylene oxide group by a reaction with ethylene oxide, those containing a hydroxyalkyl group by a reaction with an epoxy compound or the like, or those obtained by reacting an aldehyde compound having various functional groups with a PVA-based resin.

In the present invention, the PVA-based resin is preferably a PVA-based resin for melt molding in consideration of molding the PVA-based resin into particles having various shapes for being contained in the diverting agent.

Among these, the PVA-based resin for melt molding is preferably a modified PVA-based resin into which a functional group is introduced, for example, preferred is a PVA-based resin containing a primary hydroxy group in the side chain or an ethylene-modified PVA-based resin, and particularly preferred is a PVA-based resin containing a primary hydroxy group in the side chain from the viewpoint of being excellent in melt moldability. The number of the primary hydroxy group in the PVA-based resin containing a primary hydroxy group in the side chain is generally 1 to 5, preferably 1 to 2, and particularly preferably 1. In addition to the primary hydroxy group, a secondary hydroxy group is preferably contained.

Examples of such a PVA-based resin containing a primary hydroxy group in the side chain include a modified PVA-based resin containing a 1,2-diol structural unit in the side chain and a modified PVA-based resin containing a hydroxyalkyl group structural unit in the side chain. Among these, it is particularly preferable to use a modified PVA-based resin containing a 1,2-diol structural unit in the side chain (hereinafter, may be referred to as "modified PVA-based resin containing a side-chain 1,2-diol structural unit") represented by the following general formula (1).

The moiety other than the 1,2-diol structural unit is a vinyl alcohol structural unit and a vinyl ester structural unit in an unsaponified moiety, similar to a general PVA-based resin.

[Chem. 1]

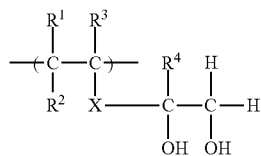

(1)

(In the general formula (1), $R^1$ to $R^4$ each independently represent a hydrogen atom or an alkyl group having 1 to 4 carbon atoms, and X represents a single bond or a bond chain.)

In the above general formula (1), $R^1$ to $R^4$ each independently represent a hydrogen atom or an alkyl group having 1 to 4 carbon atoms. $R^1$ to $R^4$ are preferably all hydrogen atoms, however may be an alkyl group having 1 to 4 carbon atoms as long as the resin properties are not remarkably impaired. The alkyl group is not particularly limited, and is preferably, for example, a methyl group, an ethyl group, an n-propyl group, an isopropyl group, an n-butyl group, an isobutyl group, and a tert-butyl group. The alkyl group may have a substituent such as a halogen group, a hydroxy group, an ester group, a carboxylic acid group, or a sulfonic acid group as needed.

In the above general formula (1), X is a single bond or a bond chain, preferably a single bond in terms of thermal stability and stability under high temperature and acidic conditions, but may be a bond chain as long as the effect of the present invention is not impaired.

Such a bond chain is not particularly limited, and examples thereof include hydrocarbon groups such as an alkylene group, an alkenylene group, an alkynylene group, a phenylene group, and a naphthylene group (these hydrocarbon groups may be substituted with a halogen atom such as a fluorine atom, a chlorine atom or a bromine atom), —O—, —(CH$_2$O)$_m$—, —(OCH$_2$)$_m$—, —(CH$_2$O)$_m$CH$_2$—, —CO—, —COCO—, —CO(CH$_2$)$_m$CO—, —CO(C$_6$H$_4$)CO—, —S—, —CS—, —SO—, —SO$_2$—, —NR—, —CONR—, —NRCO—, —CSNR—, —NRCS—, —NRNR—, —HPO$_4$—, —Si(OR)$_2$—, —OSi(OR)$_2$—, —OSi(OR)$_2$O—, —Ti(OR)$_2$—, —OTi(OR)$_2$—, —OTi(OR)$_2$O—, —Al(OR)—, —OAl(OR)—, and —OAl(OR)O—. Each R is independently a hydrogen atom or an optional substituent, and is preferably a hydrogen atom or an alkyl group (particularly an alkyl group having 1 to 4 carbon atoms). In addition, m is a natural number, and is preferably 1 to 10, particularly preferably 1 to 5. Among these, the bond chain is preferably an alkylene group having 6 or less carbon atoms, particularly a methylene group, or —CH$_2$OCH$_2$— in terms of viscosity stability and heat resistance during production.

In a particularly preferred structure of the 1,2-diol structural unit represented by the general formula (1), $R^1$ to $R^4$ are all hydrogen atoms, and X is a single bond.

The degree of saponification (measured according to JIS K 6726:1994) of the PVA-based resin used in the present invention is generally 60 mol % to 100 mol %. The degree of saponification is preferably 90 mol % or more, and more preferably 95 mol % or more. When the degree of saponification is too low, the water solubility tends to decrease. Further, the upper limit is more preferably 99.8 mol % or less, and still more preferably 99.5 mol % or less.

The average polymerization degree of the PVA-based resin used in the present invention (measured according to JIS K 6726:1994) is generally 100 to 3,500, preferably 150 to 3000, more preferably 200 to 2,500, and still more preferably 300 to 2,000. When the average polymerization degree is too large, the production tends to be difficult.

In a case where the PVA-based resin is a modified PVA-based resin, the modification rate in this modified PVA-based resin, that is, the content of a structural unit derived from various monomers in the copolymer, or the content of functional groups introduced by a post-reaction cannot be said unconditionally because the characteristics vary greatly depending on the type of functional group, and is generally 0.1 mol % to 20 mol %.

For example, the modification rate when the PVA-based resin is the modified PVA-based resin containing a side-chain 1,2-diol structural unit is generally 0.1 mol % to 20 mol %, preferably 0.5 mol % to 10 mol %, more preferably 1 mol % to 8 mol %, and particularly preferably 1 mol % to 3 mol %. When the modification rate is too high, the fractures cannot be filled temporarily, and when the modification rate is too low, the solubility after a certain period of time will deteriorate.

The content (modification rate) of the 1,2-diol structural unit in the PVA-based resin can be determined from a $^1$H-NMR spectrum (solvent: DMSO-d$_6$, internal standard: tetramethylsilane) of a PVA-based resin having a degree of saponification of 100 mol %. Specifically, the content can be calculated based on the peak areas derived from a hydroxy proton, a methine proton, and a methylene proton in the 1,2-diol structural unit, a methylene proton in the main chain, a proton of a hydroxy group linked to the main chain, and the like.

The modification rate when the PVA-based resin is an ethylene-modified PVA-based resin is generally 0.1 mol % to 15 mol %, preferably 0.5 mol % to 10 mol %, still preferably 1 mol % to 10 mol %, and particularly preferably 5 mol % to 9 mol %. When the modification rate is too high, the water solubility tends to decrease; when the modification rate is too low, the melt molding tends to be difficult.

The melting point of the PVA-based resin is generally 140° C. to 250° C., preferably 150° C. to 245° C., more preferably 160° C. to 240° C., and still more preferably 170° C. to 230° C.

The melting point is a value measured with a differential scanning calorimeter (DSC) at a temperature rising/falling rate of 10° C./min.

The bonding mode of the main chain of the PVA-based resin used in the present invention is mainly 1,3-diol bonding, and the content of a 1,2-diol bond is about 1.5 mol % to 1.7 mol %. The content of the 1,2-diol bond can be increased by increasing a polymerization temperature during polymerization of the vinyl ester monomers, and the content thereof can be increased to 1.8 mol % or more, and further to 2.0 mol % to 3.5 mol %.

Examples of a method for producing the PVA-based resin used in the present invention include a method of polymerizing vinyl ester monomers such as vinyl acetate and performing saponification.

Examples of the vinyl ester monomer include vinyl propionate, vinyl butyrate, vinyl caproate, vinyl caprylate, vinyl caprate, vinyl laurate, vinyl myristate, vinyl palmitate, vinyl stearate, vinyl cyclohexanecarboxylate, vinyl piperate, vinyl octylate, vinyl monochloroacetate, vinyl adipate, vinyl methacrylate, vinyl crotonate, vinyl sorbate, vinyl benzoate, vinyl cinnamate, and vinyl trifluoroacetate. From the viewpoint of price and availability, vinyl acetate is preferably used.

The polymerization of the vinyl ester monomers can be performed by any known polymerization method such as solution polymerization, suspension polymerization, and emulsion polymerization. Among these, it is preferable to perform the solution polymerization which can remove reaction heat efficiently under reflux. As a solvent for the solution polymerization, an alcohol is generally used, and a lower alcohol having 1 to 3 carbon atoms is preferably used.

For the saponification of the obtained polymer, a conventional known saponification method can be employed. That is, the saponification can be performed using an alkali catalyst or an acid catalyst in a state where the polymer is dissolved in an alcohol or a water/alcohol solvent.

As the alkali catalyst, for example, alkali metal hydroxides such as potassium hydroxide, sodium hydroxide, sodium methylate, sodium ethylate, potassium methylate, and lithium methylate, or alcoholate can be used.

Generally, saponification is preferably performed by a transesterification reaction using an alkali catalyst in the presence of an anhydrous alcohol solvent in terms of reaction rate or reduction of impurities such as fatty acid salts.

The reaction temperature of the saponification reaction is generally 20° C. to 60° C. When the reaction temperature is too low, the reaction rate tends to decrease and the reaction efficiency tends to decrease; when the reaction temperature is too high, the reaction temperature may exceed the boiling point of the reaction solvent, and the safety in production tends to decrease. In a case of performing the saponification under a high pressure using a tower-type continuous saponification tower with high pressure resistance, the saponification can be performed at a higher temperature, for example, 80° C. to 150° C., and a PVA-based resin with a high degree of saponification can be obtained in a short time even using a small amount of saponification catalyst.

The modified PVA-based resin containing a side-chain 1,2-diol structural unit can be produced by a known production method. For example, the above modified PVA-based resin can be produced by a method described in JP-A-2002-284818, JP-A-2004-285143, or JP-A-2006-95825. That is, the above modified PVA-based resin can be produced by (i) a method of saponifying a copolymer of a vinyl ester monomer and a compound represented by the following general formula (2), (ii) a method of saponifying and decarboxylating a copolymer of a vinyl ester monomer and a vinyl ethylene carbonate represented by the following general formula (3), (iii) a method of saponifying and deketalizing a copolymer of a vinyl ester monomer and a 2,2-dialkyl-4-vinyl-1,3-dioxolane represented by the following general formula (4), or the like.

[Chem. 2]

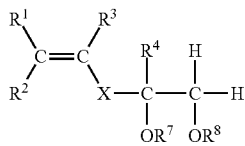

(2)

(In the general formula (2), $R^1$ to $R^4$ each independently represent a hydrogen atom or an alkyl group having 1 to 4 carbon atoms, X represents a single bond or a bond chain, and $R^7$ and $R^8$ each independently represent a hydrogen atom or $R^9$—CO— (wherein, $R^9$ is an alkyl group having 1 to 4 carbon atoms).)

[Chem. 3]

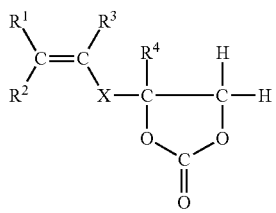

(3)

(In the general formula (3), $R^1$ to $R^4$ each independently represent a hydrogen atom or an alkyl group having 1 to 4 carbon atoms, and X represents a single bond or a bond chain.)

[Chem. 4]

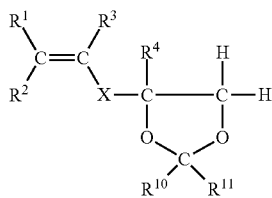

(4)

(In the general formula (4), $R^1$ to $R^4$ each independently represent a hydrogen atom or an alkyl group having 1 to 4 carbon atoms, X represents a single bond or a bond chain, and $R^{10}$ and $R^{11}$ each independently represent a hydrogen atom or an alkyl group having 1 to 4 carbon atoms.)

Specific examples and preferred examples of $R^1$ to $R^4$ and X in the general formulas (2) to (4) are the same as those in the above general formula (1), and specific examples and preferred examples of the alkyl group having 1 to 4 carbon atoms of $R^7$ to $R^{11}$ are also the same as those of the general formula (1).

Among the above methods, the method (i) is preferred in that copolymerization reactivity and industrial handling are excellent. In particular, as the compound represented by the general formula (2), it is preferable to use 3,4-diacyloxy-1-butene in which $R^1$ to $R^4$ are hydrogen atoms, X is a single bond, $R^7$ and $R^8$ are $R^9$—CO—, and $R^9$ is an alkyl group having 1 to 4 carbon atoms. Among these, 3,4-diacetoxy-1-butene in which $R^9$ is a methyl group is particularly preferably used.

The PVA-based resin used in the present invention may be composed of one type of resin, or may be a mixture of two or more types of resins. In the case of using two or more types of the PVA-based resin, for example, a combination of two or more unmodified PVA-based resins with different degrees of saponification, viscosity average polymerization degrees, or melting points; a combination of an unmodified PVA-based resin and a modified PVA-based resin; a combination of two or more modified PVA-based resins with different degrees of saponification, viscosity average polymerization degrees, melting points, functional group types or modification rates; or a combination of PVA produced by melt molding and PVA obtained without melt molding is used. It is preferable that average values of the degree of saponification, the viscosity average polymerization degrees, the modification rates or the like are within preferred ranges of the present invention.

[Diverting Agent]

The diverting agent of the present invention contains the above PVA-based resin particles (particle mixture).

The content of the PVA-based resin particles is preferably 50 mass % to 100 mass %, more preferably 80 mass % to 100 mass %, and still more preferably 90 mass % to 100 mass % with respect to the entire diverting agent. When the content is too small, the effects of the present invention tend to be difficult to obtain.

In addition to the PVA-based resin particles, additives (agents) such as sand, iron, ceramic, and other biodegradable resins can be blended in the diverting agent of the present invention as long as the effect of the present invention is not impaired.

The amount of the additive (agent) to be blended is preferably 50 mass % or less, more preferably 20 mass % or less, and still more preferably 10 mass % or less with respect to the entire diverting agent.

The diverting agent can be produced by uniformly mixing the PVA-based resin particles of the present invention and other additives (agents).

When petroleum, natural gas, or the like is excavated in a hydraulic fracturing method, the diverting agent of the present invention enters fractures or fissures formed in the well, and then temporarily fills the fractures or fissures, so that new fractures or fissures can be formed. As a method for filling the fractures or fissures, the diverting agent of the present invention is allowed to flow into the fracture to be filled with a flow of fluid in the well.

Further, since the diverting agent of the present invention is water-soluble and biodegradable, the diverting agent is rapidly dissolved in water and removed after use, and is then biodegraded. Therefore, environmental load is small, and the diverting agent is very useful.

EXAMPLES

Hereinafter, the present invention will be described more specifically with reference to Examples and Comparative Examples, but the present invention is not limited to these Examples. In the following Examples and Comparative Examples, "parts" and "%" are based on mass unless otherwise specified.

The method for producing polyvinyl alcohol (PVA)-based resin particles (PVA-1 to PVA-7) used in Examples and Comparative Examples is as follows.

Production Example 1: Production of Columnar PVA-Based Resin Particles (PVA-1)

Into a reaction can equipped with a reflux condenser, a dropping device, and a stirrer, 20 parts of vinyl acetate (20% of the total was used for initial charge), 32.5 parts of methanol, and 0.8 part of 3,4-diacetoxy-1-butene (20% of the total was used for initial charge) were charged, and the temperature was raised under a nitrogen stream while stirring. After reaching the boiling point, 0.093 part of acetyl peroxide was charged, and polymerization was started.

After 0.4 hour from the start of polymerization, 80 parts of vinyl acetate and 3.2 parts of 3,4-diacetoxy-1-butene were dropped at a constant speed over 11 hours. When the polymerization rate of vinyl acetate was 91%, a predetermined amount of m-dinitrobenzene was added to complete the polymerization, and then distillation was performed while blowing methanol vapor to remove unreacted vinyl acetate monomer out of the system to obtain a methanol solution of a copolymer.

Then, the above solution was diluted with methanol and adjusted to have a solid content concentration of 50%, and this methanol solution was charged into a kneader. The solution temperature was maintained at 35° C., and a methanol solution of 2% sodium hydroxide (in terms of sodium) was added in an amount of 4.8 mmol with respect to 1 mol (total amount) of vinyl acetate structural units and 3,4-diacetoxy-1-butene structural units in the copolymer, thereby performing saponification. When the saponification proceeded, a saponified product precipitated and became particulate. At this time, a methanol solution of 2% sodium hydroxide (in terms of sodium) was further added in an amount of 7.5 mmol with respect to 1 mol (total amount) of vinyl acetate structural units and 3,4-diacetoxy-1-butene structural units, thereby performing saponification. Thereafter, acetic acid for neutralization was added in an amount corresponding to 0.8 equivalent of sodium hydroxide. The saponified product was filtered, well washed with methanol and dried in a hot air dryer to obtain a modified PVA containing a side-chain 1,2-diol structural unit.

The degree of saponification of the obtained modified PVA containing a side-chain 1,2-diol structural unit was analyzed by alkali consumption required for hydrolysis of the residual vinyl acetate and 3,4-diacetoxy-1-butene structural units in the resin, and was found to be 99 mol %. The viscosity average polymerization degree was analyzed according to JIS K6726, and was found to be 530.

In the modified PVA containing a side-chain 1,2-diol structural unit, the content (modified amount) of the 1,2-diol structural unit represented by the above formula (1) was calculated based on an integrated value determined by $^1$H-NMR (300 MHz proton NMR, a $d_6$-DMSO solution, internal standard substance: tetramethylsilane, 50° C.), and was found to be 2 mol %.

The above obtained modified PVA containing a side-chain 1,2-diol structural unit was charged into an extruder, and further mixed with 500 ppm of magnesium stearate and 500 ppm of magnesium 12-hydroxystearate, and the mixture was melted and kneaded under the following conditions. The obtained product was solidified by air cooling, and then cut using a cutter (strand cutting method). Thereafter, drying was performed to obtain columnar PVA-based resin particles (PVA-1) having a diameter of 2.6 mm and an axial length of 3 mm.

(Melting and kneading conditions)

Extruder 15 mm in diameter, L/D=60, manufactured by Technovel Corporation

Rotation speed: 200 rpm

Discharge rate: 1.2 to 1.5 kg/h

Extrusion temperature: C1/C2/C3/C4/C5/C6/C7/C8/D=90/170/200/215/215/220/225/225/225° C.

Production Example 2: Production of Powdery PVA-Based Resin Particles (PVA-2)

A modified PVA containing a side-chain 1,2-diol structural unit (PVA-2) was obtained in the same manner as in the above Production Example 1, except that 100 parts of vinyl acetate, 23 parts of methanol, and 2 parts of 3,4-diacetoxy-1-butene were charged in an initial batch, and the polymerization was terminated at a polymerization rate of 58%, unlike in the above Production Example 1. The obtained modified PVA containing a side-chain 1,2-diol structural unit (PVA-2) was spherical particles (powder), and the average particle diameter calculated by the dry sieving test method as the diameter at which the integrated value became 50% was 429 μm.

The degree of saponification of the modified PVA containing a side-chain 1,2-diol structural unit (PVA-2) was analyzed by alkali consumption required for hydrolysis of the residual vinyl acetate and 3,4-diacetoxy-1-butene structural units in the resin, and was found to be 99 mol %. The viscosity average polymerization degree was analyzed according to JIS K6726, and was found to be 1800.

In addition, in the modified PVA containing a side-chain 1,2-diol structural unit (PVA-2), the content (modified amount) of the 1,2-diol structural unit represented by the above formula (1) was calculated based on an integrated value determined by $^1$H-NMR (300 MHz proton NMR, a $d_6$-DMSO solution, internal standard substance: tetramethylsilane, 50° C.), and was found to be 1 mol %.

Production Example 3: Production of Powdery PVA-Based Resin Particles (PVA-3)

Into a reaction can equipped with a reflux condenser, a dropping device, and a stirrer, 20 parts of vinyl acetate (20% of the total was used for initial charge) and 34.5 parts of methanol were charged, and the temperature was raised under a nitrogen stream while stirring. After reaching the boiling point, 0.068 part of acetyl peroxide was charged, and polymerization was started.

After 0.4 hour from the start of polymerization, 80 parts of vinyl acetate was dropped at a constant speed over 9.5 hours. When the polymerization rate of vinyl acetate was 89%, a predetermined amount of hydroquinone monomethyl ether was added to complete the polymerization, and then distillation was performed while blowing methanol vapor to remove unreacted vinyl acetate monomer out of the system to obtain a methanol solution of a vinyl acetate polymer.

Then, the above solution was diluted with methanol and adjusted to have a solid content concentration of 50%, and this methanol solution was charged into a kneader. The solution temperature was maintained at 35° C., and a methanol solution of 2% sodium hydroxide (in terms of sodium) was added in an amount of 4.8 mmol with respect to 1 mol of vinyl acetate structural units, thereby performing saponification. When the saponification proceeded, a saponified product precipitated and became particulate. At this time, a methanol solution of 2% sodium hydroxide (in terms of sodium) was further added in an amount of 7.5 mmol with respect to 1 mol of the vinyl acetate structural units, thereby performing saponification. Thereafter, acetic acid for neutralization was added in an amount corresponding to 0.8 equivalent of sodium hydroxide. The saponified product was filtered, well washed with methanol and dried in a hot air dryer to obtain an unmodified PVA (PVA-3). The obtained unmodified PVA (PVA-3) was spherical particles (powder) having an average particle diameter of 612 μm.

The degree of saponification of the unmodified PVA (PVA-3) was analyzed by alkali consumption required for hydrolysis of the residual vinyl acetate structural units in the resin, and was found to be 99 mol %. The viscosity average polymerization degree was analyzed according to JIS K6726, and was found to be 500.

Production Example 4: Production of Columnar PVA-Based Resin Particles (PVA-4)

The unmodified PVA (PVA-3) obtained in the above Production Example 3 was used, and similar to Production Example 1, 500 ppm of magnesium stearate and 500 ppm of magnesium 12-hydroxystearate were added. The mixture was melted and kneaded in an extruder, to obtain columnar PVA-based resin particles (PVA-4) having a diameter of 2.6 mm and an axial length of 3 mm.

Production Example 5: Production of Powdery PVA-Based Resin Particles (PVA-5)

A modified PVA containing a side-chain 1,2-diol structural unit (PVA-5) was obtained in the same manner as in the above Production Example 1, except that 100 parts of vinyl acetate, 32.5 parts of methanol, and 2 parts of 3,4-diacetoxy-1-butene were used, unlike in the above Production Example 1. The obtained modified PVA containing a side-chain 1,2-diol structural unit (PVA-5) was spherical particles (powder) having an average particle diameter of 745 μm.

The degree of saponification of the modified PVA containing a side-chain 1,2-diol structural unit (PVA-5) was analyzed by alkali consumption required for hydrolysis of the residual vinyl acetate and 3,4-diacetoxy-1-butene structural units in the resin, and was found to be 99 mol %. The viscosity average polymerization degree was analyzed according to JIS K6726, and was found to be 450.

In addition, in the modified PVA containing a side-chain 1,2-diol structural unit (PVA-5), the content (modified amount) of the 1,2-diol structural unit represented by the above formula (1) was calculated based on an integrated value determined by $^1$H-NMR (300 MHz proton NMR, a $d_6$-DMSO solution, internal standard substance: tetramethylsilane, 50° C.), and was found to be 1 mol %.

Production Example 6: Production of Powdery PVA-Based Resin Particles (PVA-6)

A modified PVA containing a side-chain 1,2-diol structural unit (PVA-6) was obtained in the same manner as in the above Production Example 1, except that 100 parts of vinyl acetate, 18 parts of methanol, and 3 parts of 3,4-diacetoxy-1-butene were used, and the polymerization was terminated at a polymerization rate of 96%, unlike in the above Production Example 1. The obtained modified PVA containing a side-chain 1,2-diol structural unit (PVA-6) was spherical particles (powder) having an average particle diameter of 1113 μm.

The degree of saponification of the modified PVA containing a side-chain 1,2-diol structural unit (PVA-6) was analyzed by alkali consumption required for hydrolysis of the residual vinyl acetate and 3,4-diacetoxy-1-butene structural units in the resin, and was found to be 99 mol %. The viscosity average polymerization degree was analyzed according to JIS K6726, and was found to be 600.

In addition, in the modified PVA containing a side-chain 1,2-diol structural unit (PVA-6), the content (modified amount) of the 1,2-diol structural unit represented by the above formula (1) was calculated based on an integrated value determined by $^1$H-NMR (300 MHz proton NMR, a $d_6$-DMSO solution, internal standard substance: tetramethylsilane, 50° C.), and was found to be 1.5 mol %.

Production Example 7: Production of Columnar PVA-Based Resin Particles (PVA-7)

A PVA-based resin particle (PVA-7) was obtained in the same manner as in Production Example 1, except that the diameter of the extrusion port of the extruder and the cutting length were adjusted to obtain columnar PVA-based resin particles having a diameter of 3.6 mm and an axial length (thickness) of 1.1 mm, unlike in Production Example 1.

Test Example 1

Example 1

PVA-1 and PVA-2 were mixed uniformly in a ratio of 80% and 20%, respectively, to prepare a PVA-based resin particles (particle mixture).

Example 2

PVA-1 and PVA-2 were mixed uniformly in a ratio of 50% and 50%, respectively, to prepare a PVA-based resin particles (particle mixture).

Example 3

PVA-1 and PVA-2 were mixed uniformly in a ratio of 10% and 90%, respectively, to prepare a PVA-based resin particles (particle mixture).

Comparative Example 1

PVA-based resin particles containing only PVA-1 were obtained.

Comparative Example 2

PVA-based resin particles containing only PVA-2 were obtained.

The PVA-based resin particles of Examples 1 to 3 and Comparative Examples 1 and 2 were evaluated as follows. The results are shown in Table 1.

[Configuration of PVA-Based Resin Particles: Particle Diameter]

The particle diameter of the PVA-based resin particles was measured by a dry sieving test method, and the content ratio of the resin particles having a particle diameter of 1,700 μm or more with respect to the resin particles having a particle diameter of 250 μm to 1,000 μm was measured.

[Measurement of Bulk Density]

About 10 g of PVA-based resin particles was charged into a measuring cylinder, the scale was read, the exact volume (ml) was read, and the weight (g) was measured. The bulk density was determined according to the following equation.

Bulk density (g/ml)=weight (g)/volume (ml)

[Measurement Angle of Repose]

The PVA-based resin particles in an amount of 500 g was put on the upper part of a device for measuring an angle of repose, then the PVA-based resin particles were dropped, the height of the mountain at the highest was read, and the angle of repose was calculated based on the length on the bottom and the height of the mountain.

[Evaluation on Filling Performance: Measurement of Water Penetration Amount]

Into a beaker, 20 g of water at 23° C. and 5 g of the PVA-based resin particles were charged and stirred for 1 minute. Then, the mixture was put into a syringe ("S-20ESz" (trade name, opening of the cylinder tip: about 2 mm) manufactured by Terumo Corporation), and left standing for 4 minutes with the cylinder tip standing downward. Thereafter, the plunger of the syringe was pressed with a load of 2 kg for 30 seconds to collect water flowing out from the cylinder tip, and the outflow of water was weighed.

TABLE 1

| | Configuration of PVA-based resin particles: type (mass %) | | Configuration of PVA-based resin particles: particle diameter (mass %) | | Bulk density (g/mL) | Angle of repose (°) | Evaluation on filling performance Water penetration amount (g) |
|---|---|---|---|---|---|---|---|
| | PVA-1 | PVA-2 | ≥1700 μm | 250 to 1000 μm | | | |
| Example 1 | 80 | 20 | 80 | 15.8 | 0.81 | 47.0 | 0.2 |
| Example 2 | 50 | 50 | 50 | 39.6 | 0.72 | 54.3 | 1.8 |
| Example 3 | 10 | 90 | 10 | 71.2 | 0.60 | 63.0 | 0.7 |
| Comparative Example 1 | 100 | 0 | 100 | 0 | 0.80 | 36.2 | 18.2 |
| Comparative Example 2 | 0 | 100 | 0 | 79.1 | 0.56 | 60.0 | 22.3 |

From the results in Table 1, it was found that the water penetration amount of Comparative Examples 1 and 2 after standing for 4 minutes was 18.2 g and 22.3 g, respectively, whereas the water penetration amount of Examples 1 to 3 after standing for 4 minutes was 2 g or less, exhibiting an excellent temporary sealing effect.

Test Example 2

Example 4

PVA-1 and PVA-5 were mixed uniformly in a ratio of 10% and 90%, respectively, to prepare PVA-based resin particles (particle mixture).

Example 5

PVA-1 and PVA-5 were mixed uniformly in a ratio of 30% and 70%, respectively, to prepare PVA-based resin particles (particle mixture).

Example 6

PVA-1 and PVA-5 were mixed uniformly in a ratio of 50% and 50%, respectively, to prepare PVA-based resin particles (particle mixture).

Example 7

PVA-1 and PVA-6 were mixed uniformly in a ratio of 30% and 70%, respectively, to prepare PVA-based resin particles (particle mixture).

Example 8

PVA-3 and PVA-4 were mixed uniformly in a ratio of 70% and 30%, respectively, to prepare PVA-based resin particles (particle mixture).

Example 9

PVA-5 and PVA-7 were mixed uniformly in a ratio of 70% and 30%, respectively, to prepare PVA-based resin particles (particle mixture).

Similar to Test Example 1, for the PVA-based resin particle mixtures of Examples 4 to 9, the content ratio of the resin particles having a particle diameter of 1,700 μm or more with respect to the resin particles having a particle diameter of 250 μm to 1,000 μm, the bulk density, the angle of repose, and the water penetration amount were measured. The results are shown in Table 2.

temperature was set to 23° C. The long sides of 120 mesh (aperture 125 μm, 10 cm×7 cm) made of nylon were folded in half, and both ends were heat-sealed to obtain a bag-like mesh (5 cm×7 cm).

1 g of resin particles was put into the obtained bag-like mesh, the opening was heat-sealed to obtain a bag-like mesh containing the resin particles, and then the mass was measured. The bag-like mesh containing the resin particles was immersed in the glass container, stirred for one hour, and then allowed to stand in a thermostat at 40° C. for one week. One week later, the bag-like mesh containing the resin particles was taken out of the glass container and dried at 140° C. for 3 hours, and the mass of the bag-like mesh containing the resin particles was measured. The mass of the resin particles remaining in the bag-like mesh was calculated based on the mass before immersion, and the residual ratio of the resin particles was calculated according to the following equation. The results are shown in Table 3.

In following equation, the solid fraction (mass %) of the resin particles can be calculated by drying the resin at 105° C. for 3 hours and measuring the mass of the resin before and after drying.

TABLE 2

| | Configuration of PVA-based resin particles: type (mass %) | | | | | | Configuration of PVA-based resin particles: particle diameter (mass %) | | Bulk density | Angle of repose | Evaluation on filling performance Water penetration |
|---|---|---|---|---|---|---|---|---|---|---|---|
| | PVA-1 | PVA-3 | PVA-4 | PVA-5 | PVA-6 | PVA-7 | ≥1700 μm | 250 to 1000 μm | (g/mL) | (°) | amount (g) |
| Example 4 | 10 | — | — | 90 | — | — | 10 | 62.5 | 0.61 | 47.4 | 6.7 |
| Example 5 | 30 | — | — | 70 | — | — | 30 | 48.6 | 0.67 | 46.3 | 0.9 |
| Example 6 | 50 | — | — | 50 | — | — | 50 | 34.7 | 0.69 | 44.2 | 1.6 |
| Example 7 | 30 | — | — | — | 70 | — | 34.2 | 26.7 | 0.57 | 48.5 | 1.1 |
| Example 8 | — | 70 | 30 | — | — | — | 30 | 51.4 | 0.77 | 48.8 | 13.5 |
| Example 9 | — | — | — | 70 | — | 30 | 30 | 47.4 | 0.67 | 42.3 | 6.1 |

From the results in Table 2, it was found that the water penetration amount in Example 8 was 13.5 g, which was slightly high, but was smaller than those of Comparative Examples 1 and 2 of Test Example 1, and thus, the primary scaling effect was obtained, and in Examples 4 to 7 and 9, an excellent primary sealing effect was obtained.

Test Example 3

The residual ratio of the PVA-based resin particles (particle mixture) of Examples 1 to 4, 7, and 9 when immersed in an aqueous solution at 40° C. for one week was measured. As Reference Example 1, the residual ratio was similarly measured using polylactic acid ("Ingeo 4032D", manufactured by NatureWorks) conventionally used as a diverting agent.

[Measurement of Residual Ratio]

A 140 mL glass container with a lid containing 100 g of water was put into a thermostatic chamber, and the water $$\text{RESIDUAL RATIO (\%)} = \left\{ \frac{\text{WEIGHT (g) OF RESIN PARTICLE RESIDUAL AFTER DRYING}}{1(g) \times \frac{\text{SOLID FRACTION (MASS \%) OF RESIN PARTICLE}}{100}} \right\} \times 100 \qquad \text{[Equation 1]}$$

TABLE 3

| | Residual ratio (%) at 40° C. for one week |
|---|---|
| Example 1 | 18.9 |
| Example 2 | 22.0 |
| Example 3 | 31.1 |
| Example 4 | 31.7 |
| Example 7 | 10.5 |
| Example 9 | 48.6 |
| Reference Example 1 | 100 |

From the results in Table 3, it was found that the resin particles in Reference Example 1 did not dissolve at all after standing at 40° C. for one week, whereas 50% or more of the resin particles in Examples 1 to 4, 7, and 9 was dissolved and had excellent solubility.

Although the present invention has been described in detail with reference to specific embodiments, it will be apparent to those skilled in the art that various changes and modifications can be made without departing from the spirit and scope of the present invention. The present application is based on a Japanese Patent Application (No. 2017-254844) filed on Dec. 28, 2017, contents of which are incorporated herein by reference.

The invention claimed is:

1. A diverting agent comprising resin particles of polyvinyl alcohol-based resin, wherein
    the resin particles of polyvinyl alcohol-based resin are a particle mixture containing two or more types of resin particles having different particle diameters, and
    the diverting agent contains resin particles A of polyvinyl alcohol-based resin having a particle diameter of 1,700 µm or more in a range of 5 mass % to 95 mass % and resin particles B of polyvinyl alcohol-based resin having a particle diameter of 250 µm to 1,000 µm in a range of 5 mass % to 95 mass %.

2. The diverting agent according to claim 1, wherein the particle mixture has a bulk density of 0.57 g/ml to 0.85 g/ml and an angle of repose of 40° to 70°.

3. The diverting agent according to claim 1, wherein the particle mixture contains two or more types of resin particles having different shapes.

4. The diverting agent according to claim 1, wherein the polyvinyl alcohol-based resin has a degree of saponification of 90 mol % or more.

5. The diverting agent according to claim 1, wherein the polyvinyl alcohol-based resin is a polyvinyl alcohol-based resin containing a primary hydroxy group in a side chain.

6. A method of filling a fracture in a well which is a method of temporarily filling a fracture generated in a well, the method comprising:
    allowing the diverting agent according to claim 1 to flow into a fracture to be filled with a flow of a fluid in the well.

* * * * *